(12) United States Patent
Tsuboi (10) Patent No.: US 11,200,036 B2
(45) Date of Patent: Dec. 14, 2021

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Masanori Tsuboi, Matsuyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/895,187

(22) Filed: Jun. 8, 2020

(65) Prior Publication Data
US 2020/0387362 A1 Dec. 10, 2020

(30) Foreign Application Priority Data
Jun. 10, 2019 (JP) .............................. JP2019-108229

(51) Int. Cl.
*G06F 8/41* (2018.01)
*G06F 8/61* (2018.01)
*G06F 8/65* (2018.01)
*G06F 8/71* (2018.01)

(52) U.S. Cl.
CPC ................ *G06F 8/433* (2013.01); *G06F 8/61* (2013.01); *G06F 8/65* (2013.01); *G06F 8/71* (2013.01)

(58) Field of Classification Search
USPC ........................................................ 717/173
See application file for complete search history.

(56) References Cited

U.S. PATENT DOCUMENTS

| 5,467,435 A | * | 11/1995 | Douglas | G06K 15/402 |
| | | | | 358/1.15 |
| 9,983,865 B2 | | 5/2018 | Tsuboi | |
| 2010/0037216 A1 | * | 2/2010 | Carcerano | G06F 8/65 |
| | | | | 717/173 |

(Continued)

FOREIGN PATENT DOCUMENTS

| JP | 2000-076048 A | | 3/2000 |
| JP | 2006227990 A | * | 8/2006 |

(Continued)

OTHER PUBLICATIONS

"JAR (file format)"; Wikipedia.org website; Apr. 24, 2019 (Year: 2019).*

*Primary Examiner* — Wei Y Zhen
*Assistant Examiner* — Clint Thatcher
(74) *Attorney, Agent, or Firm* — Venable LLP (57) ABSTRACT

The information processing apparatus obtains attribute information of an application from the server in accordance with an instruction for instructing an update of an application stored in the storage unit and searches for and retrieves an application in a dependency relationship with the application to be updated based on the attribute information. The apparatus determines whether or not it is possible to allocate in the storage unit a free area in which it is possible to store the application to be updated and the retrieved application in the dependency relationship with the application to be updated, and, in a case that it is determined that the free area can be allocated, downloads, from the server, the application to be updated and the application in the dependency relationship with the application to be updated.

10 Claims, 9 Drawing Sheets

(56) References Cited

U.S. PATENT DOCUMENTS

| | | | |
|---|---|---|---|
| 2010/0095293 A1* | 4/2010 | O'Neill | G06F 8/658 |
| | | | 717/173 |
| 2011/0035739 A1* | 2/2011 | Harada | G06F 1/3203 |
| | | | 717/168 |
| 2016/0188310 A1* | 6/2016 | Hayami | G06F 8/61 |
| | | | 717/174 |
| 2020/0388377 A1* | 12/2020 | MacDonald | G16H 40/20 |

FOREIGN PATENT DOCUMENTS

| | | | |
|---|---|---|---|
| JP | 2007213189 A | * | 8/2007 |
| JP | 2010033421 A | | 2/2010 |

* cited by examiner

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

An OSGi framework has been proposed by the OSGi (Open Services Gateway initiative) as a framework for management of the life cycle of applications such as the starting and stopping of an application, and the like. In the OSGi framework, the format of an application is defined as a jar file which is a compressed format of Java (registered trademark). A jar file is something in which a plurality of class files are collected into a single archive. Internally, one manifest file called MANIFEST.MF is held, and a description of the jar file is defined therein. Attributes of the OSGi specification are defined in such a manifest file, the OSGi framework manages a life cycle of an application in accordance with the defined attributes.

More and more image forming apparatuses are equipped with a mechanism by which, after shipping, the installation and loading of applications is tried out, and the above-described OSGi framework is conformed to. Also, independent attributes such as an application ID and a maximum usage of HDD space have been defined in manifest files to extend the OSGi specification attributes.

Japanese Patent Laid-Open No. 2000-76048 and Japanese Patent Laid-Open No. 2010-33421 are documents that deal with the installation of applications. Japanese Patent Laid-Open No. 2000-76048 describes displaying the HDD space necessary for installation of an application. Also, Japanese Patent Laid-Open No. 2010-33421 describes that applications are installed considering application installation order and settings at the time of installation.

However, in the prior art, it has not been possible to update applications in consideration of a dependency relationship between installed applications and of available space in an HDD when there are limited HDD resources as in the case of image forming apparatuses.

SUMMARY OF THE INVENTION

An aspect of the present invention is to eliminate the above-mentioned problem with conventional technology.

The feature of the present invention is to provide a technique by which an application can be updated considering a dependency relationship between applications and available space in a storage region.

According to a first aspect of the present invention, there is provided an information processing apparatus operable to download an application from a server, the apparatus comprising: at least one processor and at least one memory configured to function as: a storage unit configured to store an application; an instruction unit configured to instruct an update of an application stored in the storage unit; an obtainment unit configured to obtain attribute information of the application from the server in accordance with the instruction from the instruction unit; a search unit configured to retrieve an application in a dependency relationship with the application to be updated based on the attribute information; a determination unit configured to determine whether or not it is possible to allocate in the storage unit a free area in which it is possible to store the application to be updated and the retrieved application in the dependency relationship with the application to be updated; and a download unit configured to, when the determination unit determines that the free area can be allocated, download, from the server, the application to be updated and the application in the dependency relationship with the application to be updated.

According to a second aspect of the present invention, there is provided a method for controlling an information processing apparatus that has a storage unit configured to store applications and is operable to download an application from a server, the method comprising: instructing an update of an application stored in the storage unit; obtaining attribute information of the application from the server in accordance with an instruction for instructing the update; searching for and retrieving an application in a dependency relationship with the application to be updated based on the attribute information; determining whether or not it is possible to allocate in the storage unit a free area in which it is possible to store the application to be updated and the retrieved application in the dependency relationship with the application to be updated; and in a case that it is determined that the free area can be allocated, downloading, from the server, the application to be updated and the application in the dependency relationship with the application to be updated.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, in the embodiments, for example, an image forming apparatus such as a multifunction peripheral is given as one example of an information processing apparatus of the present invention, but the present invention is not limited to this.

First Embodiment

Figure 1:
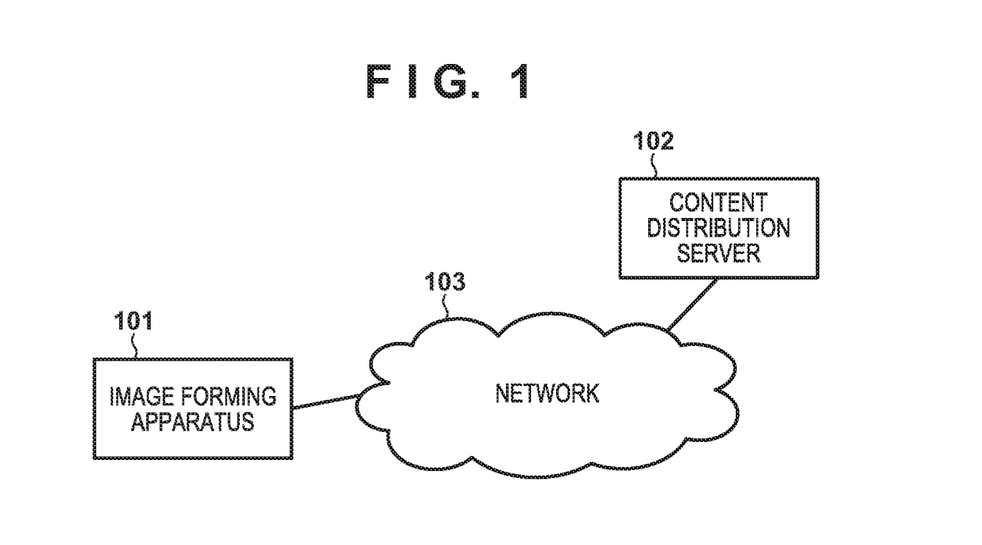
FIG. 1 is a configuration diagram of a network system including an image forming apparatus according to a first embodiment of the present invention.

FIG. 1 is a configuration diagram of a network system including an image forming apparatus 101 according to a first embodiment of the present invention.

The image forming apparatus 101 is a multifunction peripheral provided with functions such as print, scan, copy and FAX. This image forming apparatus 101 has an individual number (identification information) specific to this image forming apparatus. A content distribution server 102 (hereinafter server 102) is used to distribute an application 601 (FIG. 6) that operates in the image forming apparatus 101. A network 103 is a network such as the Internet, and the image forming apparatus 101 can perform communication with the server 102 via the network 103.

Figure 2:
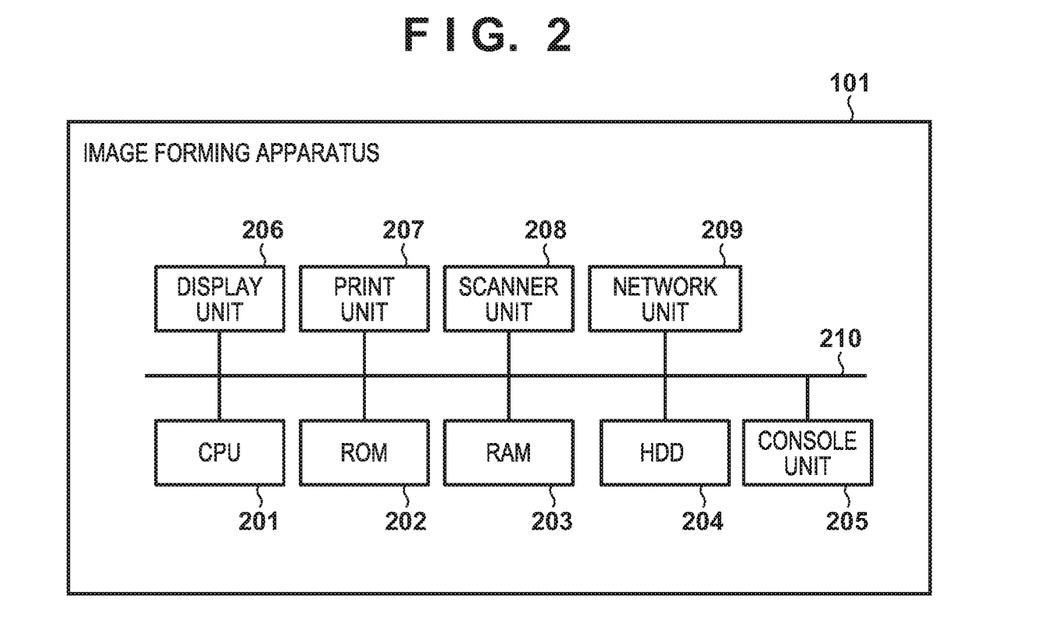
FIG. 2 is a block diagram for describing a hardware configuration of the image forming apparatus according to the first embodiment.

FIG. 2 is a block diagram for describing a hardware configuration of the image forming apparatus 101 according to the first embodiment.

A CPU (Central Processing Unit) 201 executes various programs to realize various functions. A ROM (Read Only Memory) 202 stores various programs. A RAM (Random Access Memory) 203 provides a system work memory for operation of the CPU 201 and is used to temporarily store various data. The CPU 201 executes a boot program stored in the ROM 202, deploys a program stored in an HDD 204 to the RAM 203, executes the deployed program, and thereby controls operations of the image forming apparatus 101. The RAM 203 includes FRAM (registered trademark) and SRAM which can hold stored contents even after power off, and also DRAM whose stored contents are lost after power off, or the like. The HDD (Hard Disk Drive) 204 is a high-capacity non-volatile storage unit which stores various programs and data, or the like. A console unit 205 is a unit for operating the image forming apparatus 101, and includes hard keys, a pointing device, or the like. A display unit 206 is a unit for displaying a UI of the image forming apparatus 101, and is formed integrally with the console unit 205. A print unit 207 prints an image on a recording medium (sheet) in accordance with various image data, such as a raster image which is received via a bus 210. A scanner unit 208 reads an original placed on an original platen, and generates image data corresponding to an image of the original. A network unit 209 can connect to the network 103 and communicate with the server 102 via the network 103. Each unit described above can transmit/receive data to/from each other via the bus 210.

Figure 3:
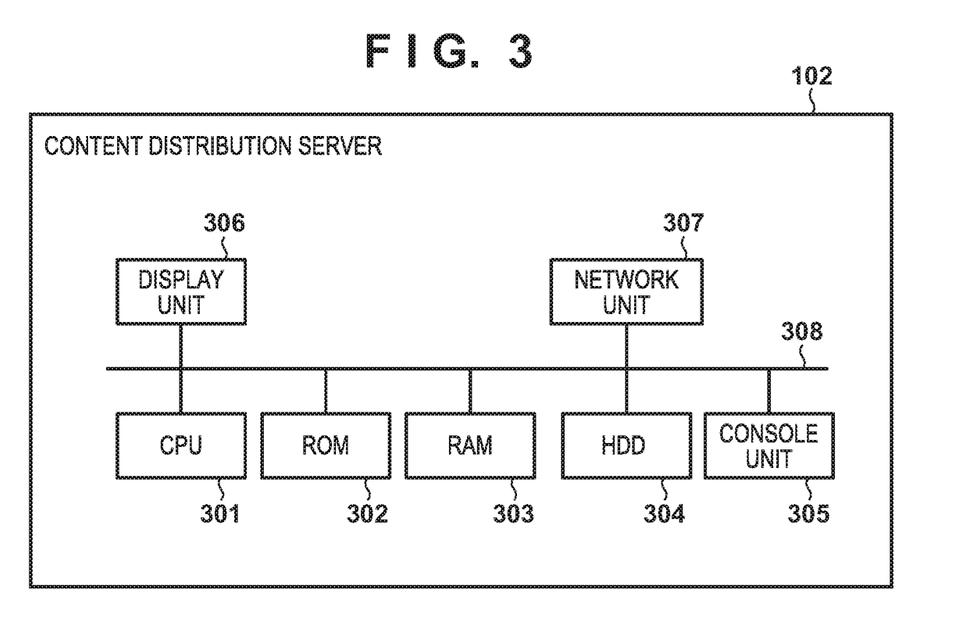
FIG. 3 is a block diagram for describing a hardware configuration of a server according to the first embodiment.

FIG. 3 is a block diagram for describing a hardware configuration of the server 102 according to the first embodiment.

A CPU 301 executes a boot program stored in a ROM 302, deploys a program installed in an HDD 304 to a RAM 303, executes the deployed program, and thereby controls operation of the server 102. The RAM 303 provides a system work memory for operating the CPU 301 and is used to temporarily store various data. The HDD 304 stores various programs and data, or the like. A console unit 305 provides a user interface, and has hard keys, a pointing device, and also a display unit 306. A network unit 307 connects to the network 103, and can communicate with the image forming apparatus 101 via the network 103. Each unit described above can transmit/receive data to/from each other via a bus 308

Figure 4:
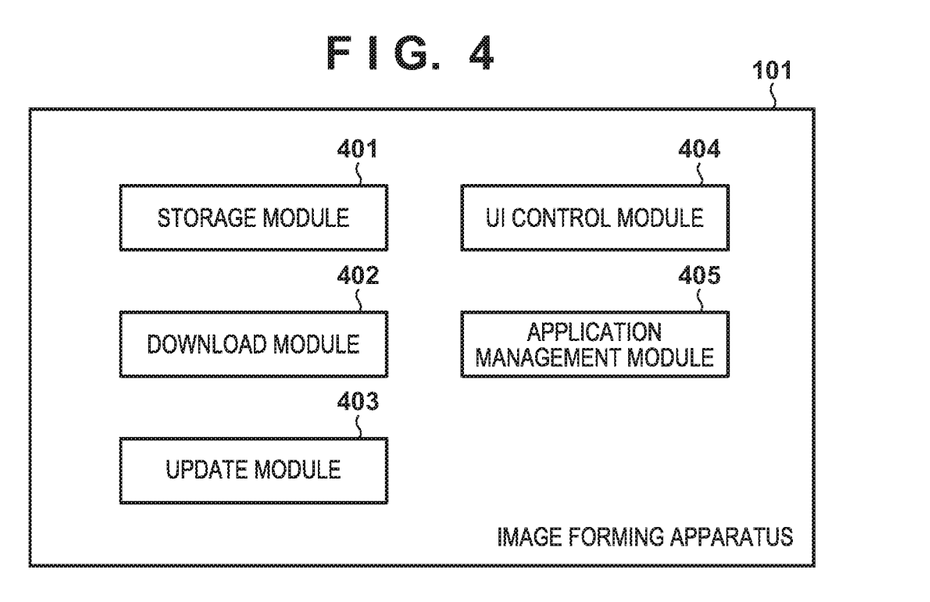
FIG. 4 is a block diagram for describing a software configuration of the image forming apparatus according to the first embodiment.

FIG. 4 is a block diagram for describing a software configuration of the image forming apparatus 101 according to the first embodiment. A program that realizes each configuration module illustrated here is stored in the HDD 204. Also, as described above, functions of each module illustrated in this block diagram are realized by the CPU 201 deploying a program to the RAM 203 and executing it.

A storage module 401 stores a main part of the application 601 (FIG. 6) that operates in the image forming apparatus 101 and information of a manifest file 602 (FIG. 6) in the HDD 204. In addition, capacity information of the HDD 204 that the application can use is stored. Note that, in the first embodiment, although HDD space is described, other resources are also possible. For example, information of a memory or another software resource may be used. A download module 402 performs processing for obtaining (downloading), from the server 102, the application 601 that operates in the image forming apparatus 101. An update module 403 updates the application 601 stored in the storage module 401. Also, the update module 403 newly installs the application 601 from the storage module 401 if the application 601 has not been installed. A UI (user interface) control module 404 controls screens to be displayed to the display unit 206. An application management module 405 manages starting and stopping of applications.

Figure 5:
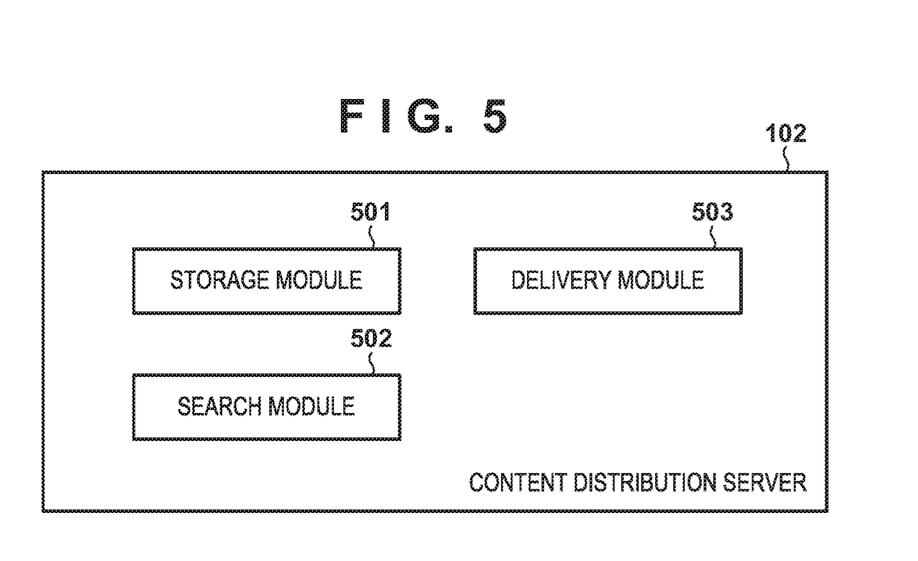
FIG. 5 is a block diagram for describing a software configuration of the server according to the first embodiment.

FIG. 5 is a block diagram for describing a software configuration of the server 102 according to the first embodiment. A program that realizes each configuration module illustrated here is stored in the HDD 304. Also, as described above, functions of each module illustrated in this block diagram are realized by the CPU 301 deploying a program to the RAM 303 and executing it.

A storage module 501 stores a main part of the application 601 and information of a manifest file 602 in the HDD 304. A search module 502 identifies an application by an Application-Id of the application 601 which is described in the manifest file 602 of the application 601, and identifies an application to upgrade by comparing numerical values of a Bundle-Version. A delivery module 503 distributes information of the manifest file 602 of the application 601 and the main part of the application 601 to the image forming apparatus 101.

Figure 6:
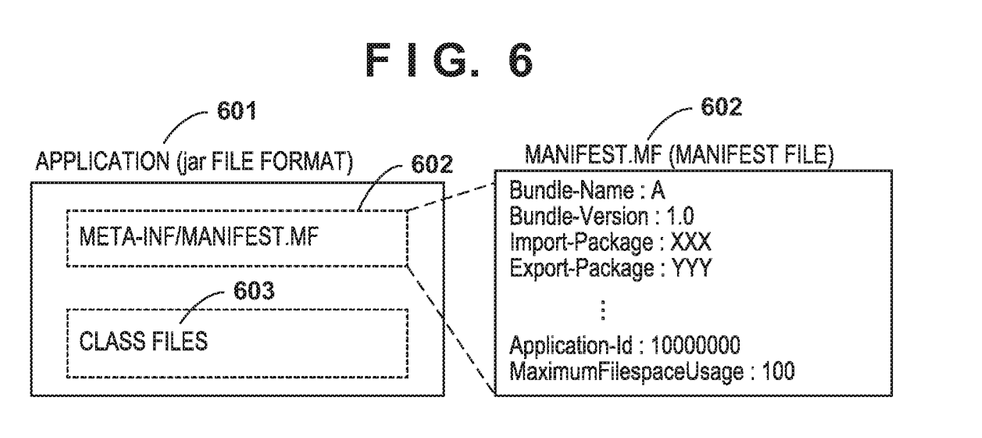
FIG. 6 depicts a view for describing a configuration of an application that operates on the image forming apparatus according to the first embodiment.

FIG. 6 depicts a view for describing a configuration of the application 601 that operates on the image forming apparatus 101 according to the first embodiment.

Here, since the application 601 is in the jar file format, the application 601 includes the manifest file 602. The main part of the application is class files 603. The manifest file 602 describes attribute information of the application 601.

For example, a Bundle-Name indicates a name of application, and in this case it is "A". The Bundle-Version indicates the version of the application, and in this case the version is 1.0. An Import-Package indicates a package which the application 601 imports, and Export-Package indicates a package which the application 601 exports. An Application-Id is an identifier of the application 601, and in this case it is "10000000". A MaximumFilespaceUsage indicates the maximum usage amount of the HDD by the application 601, and it's "100" Megabytes here.

Figure 7:
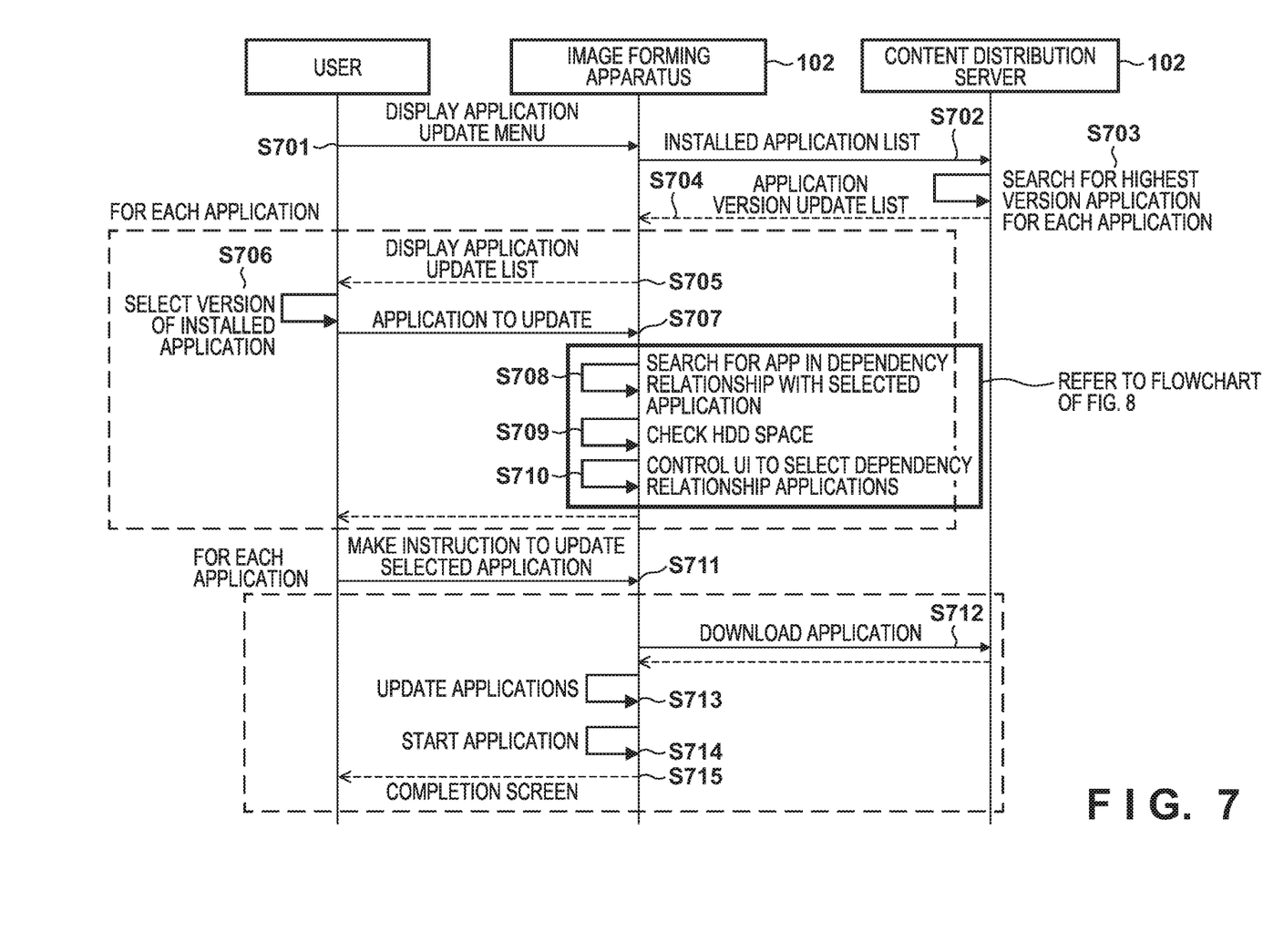
FIG. 7 is a sequence diagram for illustrating processing for when the image forming apparatus and the server according to the first embodiment update applications installed on an image forming apparatus upon an instruction by a user.

FIG. 7 is a sequence diagram for illustrating processing for when the image forming apparatus 101 and the server 102 according to the first embodiment updates applications 601 installed on the image forming apparatus 101 upon an instruction by a user.

In S701, a user displays an application update menu and instructs to update an application. Specifically, a user instructs to update applications on a UI screen (FIG. 9) which the UI control module 404 displays.

Figure 9:
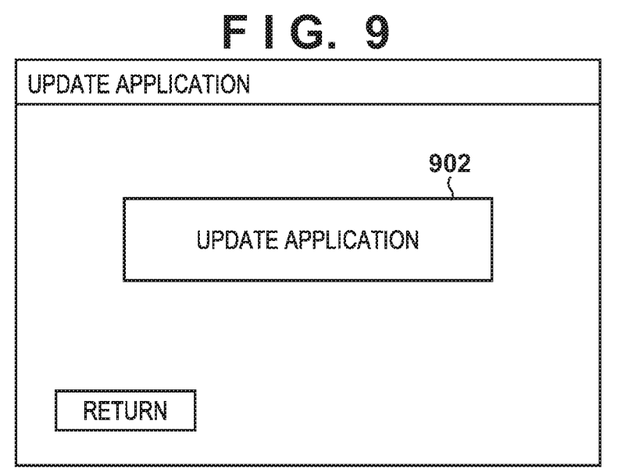
FIG. 9 is a diagram illustrating an example of an update menu screen that is displayed on a display unit of the image forming apparatus according to the first embodiment.

FIG. 9 is a diagram illustrating an example of an update menu screen that is displayed on the display unit 206 of the image forming apparatus 101 according to the first embodiment.

A user, on this screen, instructs to update applications by pressing an application update button 902.

Next, in S702, the update module 403 of the image forming apparatus 101 transmits, based on information of the manifest files 602 which the storage module 401 holds, information of a list of applications installed in the image forming apparatus 101 (specifically, Application-Id and Bundle-Version information) to the server 102. Here, an application ID (identification information) and a version of the applications are transmitted to the server 102. Thereby, the server 102 identifies applications based on the application IDs received from the image forming apparatus 101, and, in S703, searches for applications whose version is newer than the version installed in the image forming apparatus 101.

In S703, the search module 502 of the server 102 searches, based on the information received in S702, for applications matching the Application-Ids described in the manifest files 602 of the applications 601, and identifies new version applications by a numeral value comparison of Bundle-Version.

Then, in S704, the delivery module 503 of the server 102 transmits information of a list of new version applications found in S703 (specifically, information of the manifest file 602) to the image forming apparatus 101. Thereby, in S705, the UI control module 404 of the image forming apparatus 101 displays a list of applications with a new version received from the server 102 (specifically, information of the Bundle-Name and Bundle-Version) to the display unit 206. The UI display in such a case is as illustrated in FIG. 10.

Figure 10:
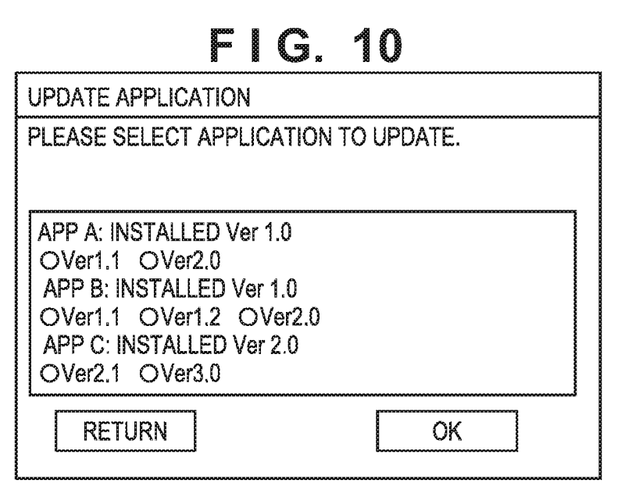
FIG. 10 is a diagram for describing an example of a new application version list display of a that is displayed on a display unit of the image forming apparatus according to the first embodiment.

FIG. 10 is a diagram for describing an example of a new application version list display that is displayed on the display unit 206 of the image forming apparatus 101 according to the first embodiment.

In FIG. 10, a list of IDs and versions of installed applications which the storage module 401 of the image forming apparatus 101 holds and the list of application versions for which an update is available obtained from the server 102 in S704 are displayed.

Next, in S706, a user selects the version of the application desired to be installed in the displayed list. Thereby, the selected application and its version are conveyed to the UI control module 404 in S707. For example, in the example of FIG. 10, a user selects the version of the application to be updated by a radio button. Thereby, the selected applications and their versions are conveyed to the UI control module 404 in S707.

After that, in S708, the update module 403 of the image forming apparatus 101 identifies applications that have a dependency relationship with the applications selected by the user. Then, in S709, based on the MaximumFilespaceUsage information in the information of the manifest file 602 received from the server 102 in S704, the update module 403 obtains the memory space necessary to download the application. Also, the available space of the HDD 204 is checked to determine whether it is possible to allocate the memory space in the HDD 204. Also, if it is possible to allocate a free area for the space needed by the application 601 in the HDD 204, the UI control module 404 puts the applications in a dependency relationship with the application 601 into a selected state in S710.

The processes of S708 to S709 are described later in detail with reference to the flowchart of FIG. 8.

Figure 11:
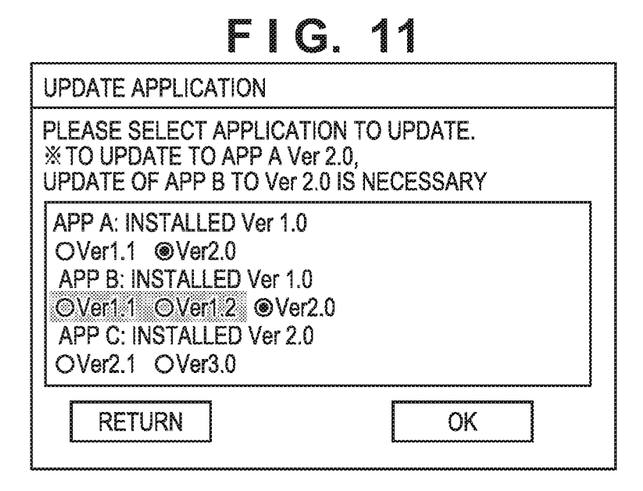
FIG. 11 is a diagram for describing an example of a screen that is displayed on a display unit of the image forming apparatus according to the first embodiment.

FIG. 11 is a diagram illustrating another example of a screen that is displayed on the display unit 206 of the image forming apparatus 101 according to the first embodiment.

Here, for example, if selection is made to update an app A to a version 2.0 on the screen of FIG. 10, it is displayed that it in order to do so, it will be necessary to update an app B to a version 2.0. Also, the radio buttons for versions 1.1 and 1.2 of the app B cease to be selectable, and the radio button for the version 2.0 is automatically selected.

Figure 12:
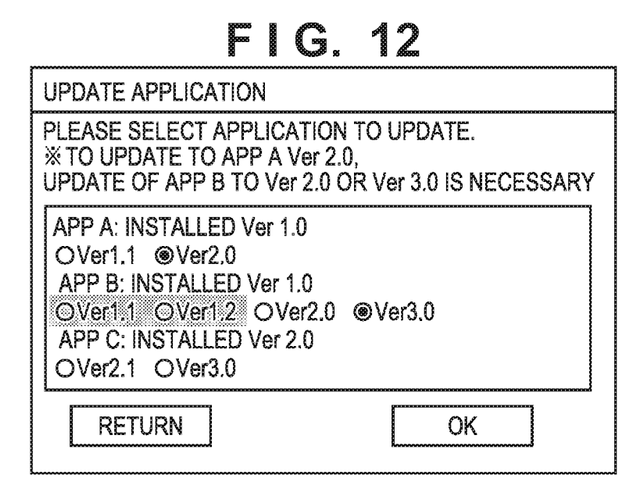
FIG. 12 is a diagram illustrating another example of a screen that is displayed on the display unit of the image forming apparatus according to the first embodiment.

FIG. 12 is a diagram illustrating another example of a screen that is displayed on the display unit 206 of the image forming apparatus 101 according to the first embodiment.

Here, for example, if selection is made to update the app A to version 2.0 on the screen of FIG. 10, it is displayed that it in order to do so, it will be necessary to update an app B to version 2.0 or to version 3.0. In such a case, the radio buttons for versions 1.1 and 1.2 of the app B cease to be selectable, and the radio buttons of version 2.0 and version 3.0 of the app B can be selected, and the radio button for the latest version 3.0 is selected.

After that, in step S711, the user instructs the update of the selected applications. Specifically, the OK button of FIG. 11 or FIG. 12 is pressed.

Thereby, the download module 402 of the image forming apparatus 101, in step S712, makes an instruction to download the applications to the server 102, and starts the downloading of the applications from the delivery module 503 of the server 102. After that, the update module 403 of the image forming apparatus 101, in step S713, uses the downloaded applications to update the selected applications and the applications in the dependency relationship with the selected applications. Also, in step S714, the updated applications are started. After that, in step S715, the UI control module 404 of the image forming apparatus 101 displays a completion screen (FIG. 13) on the display unit 206, and ends the processing of this example.

Figure 13:
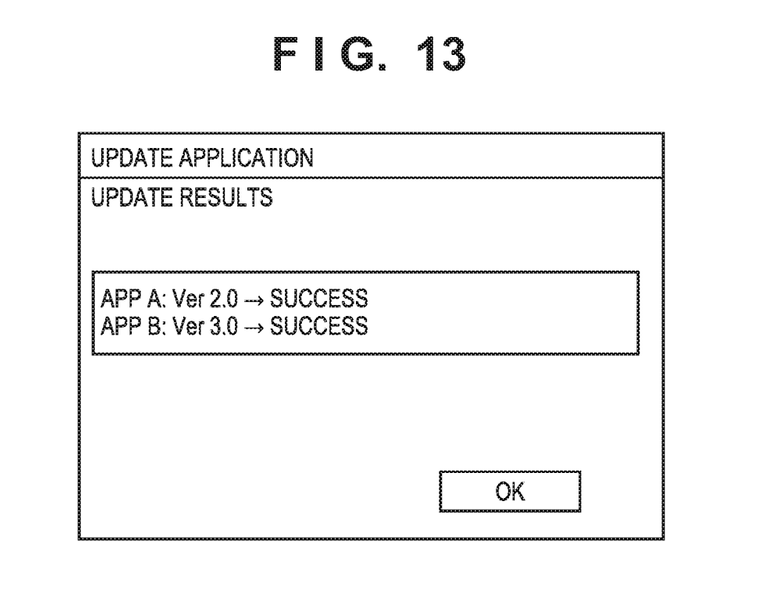
FIG. 13 is a diagram illustrating an example of an update completion screen that is displayed on the display unit of the image forming apparatus according to the first embodiment.

FIG. 13 is a diagram illustrating an example of an update completion screen that is displayed on the display unit 206 of the image forming apparatus 101 according to the first embodiment.

Here, it is displayed that the version 2.0 app A and version 3.0 app B updates have completed.

Figure 8:
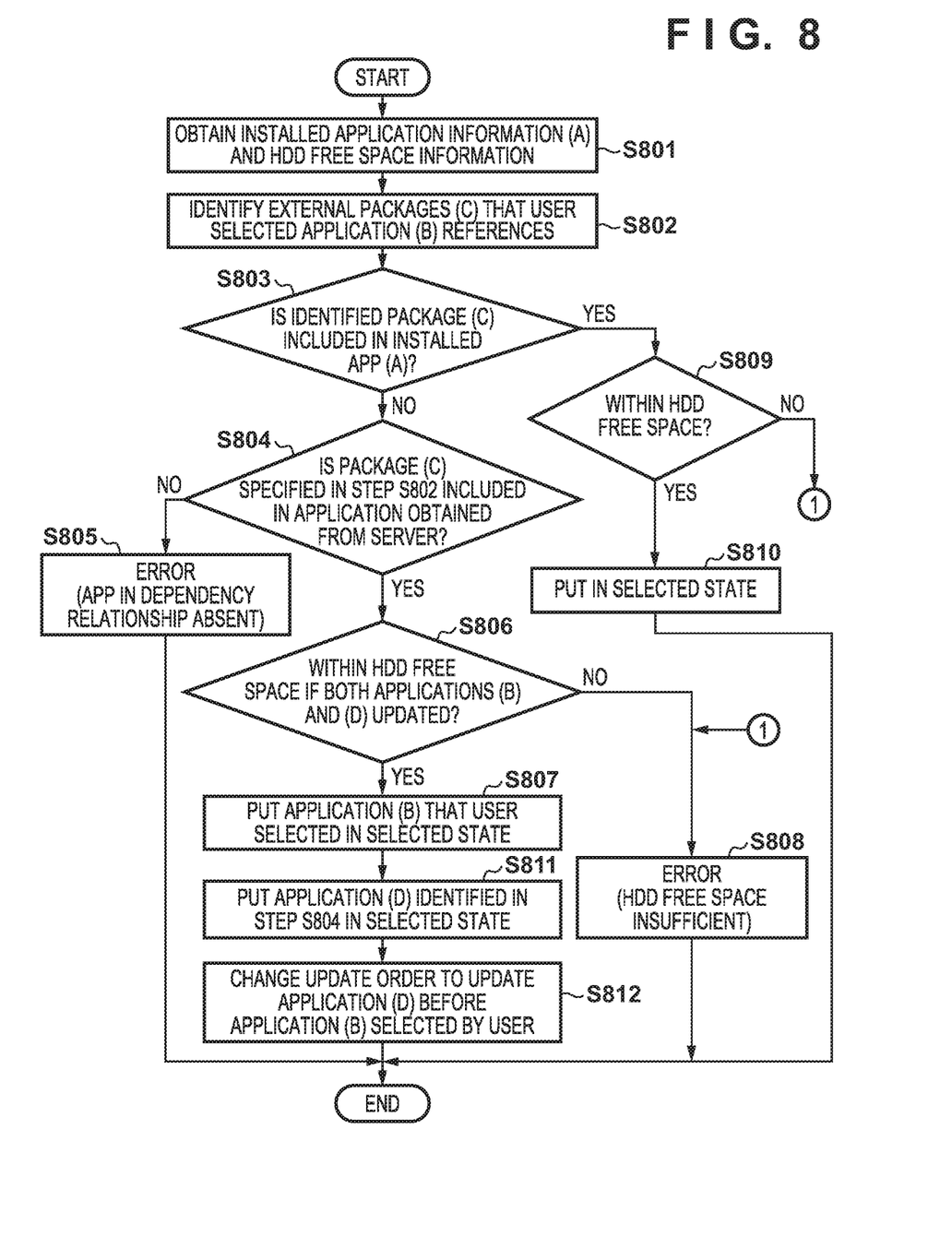
FIG. 8 is a flowchart for describing an application update processing in the image forming apparatus according to the first embodiment.

FIG. 8 is a flowchart for describing an application update process in the image forming apparatus 101 according to the first embodiment. Note that the processing illustrated in this flowchart is achieved by the CPU 201 executing a program that has been deployed to the RAM 203.

In step S801, the CPU 201 functions as the update module 403, and obtains installed application information (A) and information of available space in the HDD 204 that can be used from the storage module 401. Next, the processing advances to step S802, and the CPU 201 functions as the update module 403, and obtains from the storage module 401 information of the manifest file 602 of an application (B) that the user selected. Also, based on the Import-Package information included therein, the CPU 201 identifies an external package (C) that is referenced by the application (B). Next, the processing advances to step S803, and the CPU 201 functions as the update module 403, and determines whether or not the package (C) identified in step S802 is included in the application information (A) obtained in step S801.

If the package is included in the application information, the processing advances to step S809 from step S803 in order to be able to determine whether the dependency relationship is preserved, and the CPU 201 functions as the update module 403, and references in the storage module 401 the available space of the HDD 204 that can be used. Then, the CPU 201 determines whether or not the application that the user selected will fit within the available space. Specifically, the MaximumFilespaceUsage value of the application before update is subtracted from the MaximumFilespaceUsage value of the updated target application, and it is determined whether that the subtraction result can be held within the available space in the HDD 204 that can be used. When it is determined here that it will fit, the processing proceeds to step S810, and the CPU 201 functions as the UI control module 404, puts the application that the user selected in the selected state, and ends the processing. Meanwhile, if the application does not fit within the available space, the processing advances to step S808, and the CPU 201 functions as the UI control module 404, performs an error display that displays that the available space in the HDD 204 is insufficient, and ends the processing.

Meanwhile, in step S803, when the package (C) identified in step S802 is not included in the application information (A) obtained in step S801, the processing advances to step S804. In step S804, the CPU 201 functions as the update module 403, and determines whether information having the identified package (C) is included in the application information obtained from the server 102 in step S704 of FIG. 7. Specifically, in the information of the manifest file 602 obtained from the server 102, applications for which the identified package (C) is described in Import-Package are identified. In the case where a plurality of versions are hits here, the application (D) of the latest version is identified. Meanwhile, if, in step S804, information having the identified package is not included, the dependency relationship cannot be preserved by updating the selected application, and so the processing advances to step S805, and the CPU 201 functions as the UI control module 404, and performs an error display, and ends the processing.

In step S804, when the application (D) can be identified, the processing advances to S806. When, in step S806, the CPU 201 functions as an update module 403, and updates both the application (B) that the user selected and the application (D) identified in step S804, the CPU 201 determines whether or not these will fit into the available space in the HDD 204. Specifically, for all of the applications scheduled to be updated, the value of MaximumFilespaceUsage for the application before update is subtracted from the value of MaximumFilespaceUsage of the update target application. Then, it is determined whether the total value of each subtracted values will fit into the available space in the HDD 204 that can be used. In step S806, when it is determined that the applications will not fit into the available space of the HDD 204, the processing advances to step S808, the CPU 201 functions as the UI control module 404, displays an error, and ends this processing.

Meanwhile, when, in step S806, the CPU 201 determines that the applications will fit within the available space of the HDD 204, the processing advances to step S807, and the CPU 201 functions as the UI control module 404, and the user puts the selected application (B) into the selected state. Also, the processing advances to step S811, and the CPU 201, in step S804, puts the identified the application (D) into the selected state. In such a case, if a plurality of applications are identified, all of them are put into the selected state.

FIG. 11 depicts a view illustrating an example of a case in which only one version is a hit in step S811. Here, Ver 2.0 of app A and Ver 2.0 of app B are being referenced. However, since only Ver 1.0 of app B has been installed, it is necessary to update app B to Ver 2.0 in order to update to Ver 2.0 of app A. Consequently, in such a case, Ver 1.1 and Ver 1.2 of app B are grayed out and made to be impossible to select, Ver 2.0 of app B is put in the selected state.

Also, FIG. 12 depicts a view illustrating an example of a case where a plurality of versions are hits in step S811. Ver 2.0 of app A references Ver 2.0 or Ver 3.0 of app B. However, since only Ver 1.0 of app B has been installed, it is necessary to update app B to Ver 2.0 or Ver 3.0 in order to update to Ver 2.0 of app A. Consequently, in such a case, Ver 1.1 and Ver 1.2 of app B are grayed out and made to be impossible to select, the latest version Ver 3.0 is put in the selected state.

Then, the processing proceeds to step S812, and the CPU 201 functions as the update module 403, and changes a list defining the update order so as to update the application that is referenced, specifically application (D), before application (B) which the user selected, and then the processing ends.

In this way, when the application update completes, a screen that displays the results of the update as illustrated in FIG. 13 described previously, for example, is displayed. In FIG. 13, it is displayed that the update to version 2.0 of app A and version 3.0 of app B completed.

By virtue of the first embodiment, as described above, it is possible to realize an update of the applications that the user designated while maintaining a dependency relationship between applications.

Second Embodiment

Next, a second embodiment of the present invention will be described.

In the second embodiment, in a case where an application that is thought to not be used, that is an application in a stopped state, is updated, it is not necessarily required that what is referenced thereby be updated first. The second embodiment considers this issue. Note that the system configuration and the hardware configurations of the image forming apparatus 101 and the server 102 according to the second embodiment are similar to the previously described first embodiment, and therefore description thereof is omitted.

Figure 14:
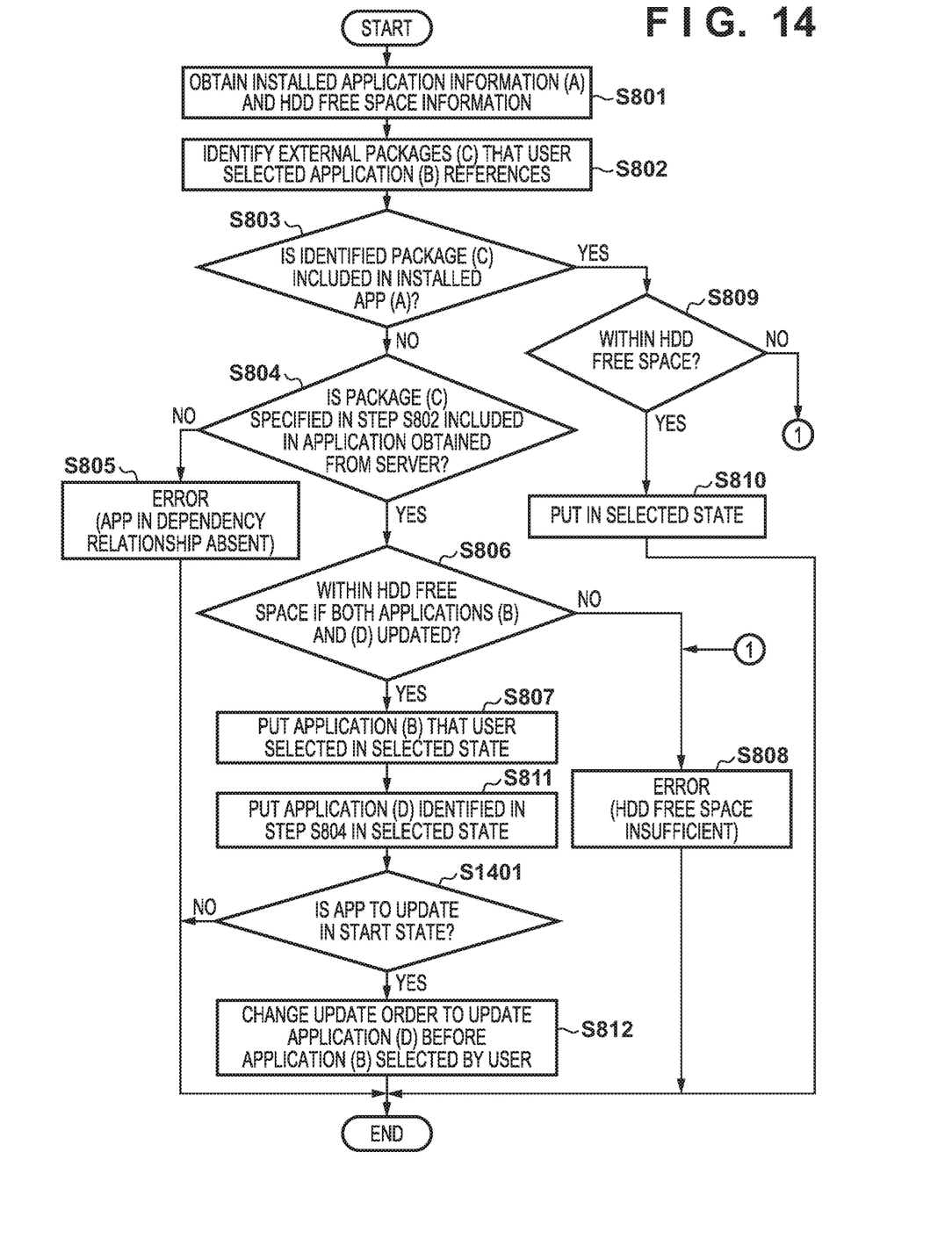
FIG. 14 is a flowchart for describing application update processing in an image forming apparatus according to a second embodiment.

FIG. 14 is a flowchart for describing an application update processing in an image forming apparatus 101 according to the second embodiment. Note that the processing illustrated in this flowchart is achieved by the CPU 201 executing a program that has been deployed to the RAM 203. Note that in the flowchart of FIG. 14, processing common to previously described FIG. 8 is indicated by the same reference numerals, and description thereof is omitted.

In step S1401, the CPU 201 functions as the update module 403, and determines whether or not the application to be updated is in a start state. If the application to be updated here is not in the start state, step S812 is skipped, and the processing is ended. Meanwhile, if the application to be updated is in the start state, the processing advances to step S812, and the list defining the update order is changed so that the application that is referenced, specifically application (D), is updated prior to the application (B) that the user selected, and the processing is ended.

As described above, by virtue of the second embodiment, if the application to be updated is in the stopped state, it is possible to update the application to be updated first rather than updating the application that is referenced thereby first.

Other Embodiments

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-108229, filed Jun. 10, 2019, which is hereby incorporated by reference herein in its entirety.

What is claimed is:

1. An information processing apparatus operable to download an application from a server, the apparatus comprising:
at least one processor and at least one memory configured to function as:
a storage unit configured to store an application;
an instruction unit configured to instruct an update of an application stored in the storage unit;
an obtainment unit configured to obtain attribute information of the application from the server in accordance with the instruction from the instruction unit;
a search unit configured to retrieve an application in a dependency relationship with the application to be updated based on the attribute information;
a determination unit configured to determine whether or not it is possible to allocate in the storage unit a free area in which it is possible to store the application to be updated and the retrieved application in the dependency relationship with the application to be updated;
a download unit configured to, when the determination unit determines that the free area can be allocated, download, from the server, the application to be updated and the application in the dependency relationship with the application to be updated, and
a display unit configured to, when the application in the dependency relationship with the application to be updated is retrieved by the search by the search unit, display a screen prompting a user to update the application in the dependency relationship with the application to be updated,
wherein the display unit displays an application in the dependency relationship with the application to be updated which is not necessary for updating the application to be updated on the screen in a state in which a selection of the application in the dependency relationship with the application to be updated which is not necessary for updating the application to be updated is impossible.

2. The information processing apparatus according to claim 1, wherein the obtainment unit, in accordance with the instruction by the instruction unit, transmits to the server identification information and a version of the application stored in the storage unit, and
obtains from the server the version and attribute information of the application.

3. The information processing apparatus according to claim 2, wherein the obtainment unit from the server obtains versions, including a latest version, of the application.

4. The information processing apparatus according to claim 1, wherein the display unit displays, on the screen, in an automatically selected state, an application in the dependency relationship with the application to be updated which is necessary for updating the application to be updated.

5. The information processing apparatus according to claim 1, wherein the at least one processor and at least one memory are configured to further function as:
a unit configured to, in accordance with the download completing, display the downloaded application, its version, an application in a dependency relationship with the downloaded application, and its version.

6. The information processing apparatus according to claim 1, wherein the download unit, prior to the application to be updated, downloads the application in the dependency relationship with the application to be updated.

7. The information processing apparatus according to claim 6, wherein in a case where the application to be updated is in a stopped state, the download unit downloads the application in the dependency relationship with the application to be updated after the application to be updated.

8. The information processing apparatus according to claim 1, wherein the applications are files in ajar file format.

9. A method for controlling an information processing apparatus that has a storage unit configured to store applications and is operable to download an application from a server, the method comprising:
instructing an update of an application stored in the storage unit;
obtaining attribute information of the application from the server in accordance with an instruction for instructing the update;
searching for and retrieving an application in a dependency relationship with the application to be updated based on the attribute information;
determining whether or not it is possible to allocate in the storage unit a free area in which it is possible to store the application to be updated and the retrieved application in the dependency relationship with the application to be updated;
in a case that it is determined that the free area can be allocated, downloading, from the server, the application to be updated and the application in the dependency relationship with the application to be updated, and
in a case that the application in the dependency relationship with the application to be updated is retrieved in the searching, displaying a screen prompting a user to update the application in the dependency relationship with the application to be updated,
wherein, in the displaying, an application in the dependency relationship with the application to be updated which is not necessary for updating the application to be updated is displayed on the screen in a state in which a selection of the application in the dependency relationship with the application to be updated which is not necessary for updating the application to be updated is impossible.

10. A non-transitory computer-readable storage medium storing a program for causing a processor to execute a method for controlling an information processing apparatus that has a storage unit configured to store applications and is operable to download an application from a server, the method comprising:
instructing an update of an application stored in the storage unit;
obtaining attribute information of the application from the server in accordance with an instruction for instructing the update;
searching for and retrieving an application in a dependency relationship with the application to be updated based on the attribute information;
determining whether or not it is possible to allocate in the storage unit a free area in which it is possible to store the application to be updated and the retrieved application in the dependency relationship with the application to be updated;
in a case that it is determined that the free area can be allocated, downloading, from the server, the application to be updated and the application in the dependency relationship with the application to be updated, and
in a case that the application in the dependency relationship with the application to be updated is retrieved in the searching, displaying a screen prompting a user to update the application in the dependency relationship with the application to be updated,
wherein, in the displaying, an application in the dependency relationship with the application to be updated which is not necessary for updating the application to be updated is displayed on the screen in a state in which a selection of the application in the dependency relationship with the application to be updated which is not necessary for updating the application to be updated is impossible.

* * * * *